US006612694B2

(12) United States Patent
Jagasia

(10) Patent No.: US 6,612,694 B2
(45) Date of Patent: *Sep. 2, 2003

(54) EYEGLASS DEVICE HAVING MAGNETICALLY ATTACHED PRIMARY AND AUXILIARY FRAMES AND METHOD OF FORMING THE DEVICE

(76) Inventor: Arun Jaswant Jagasia, 150 S.I.C.H. Society, Chembur, Mumbai-400071 (IN)

( * ) Notice: Subject to any disclaimer, the term of this patent is extended or adjusted under 35 U.S.C. 154(b) by 0 days.

This patent is subject to a terminal disclaimer.

(21) Appl. No.: 10/055,590

(22) Filed: Oct. 26, 2001

(65) Prior Publication Data

US 2002/0067460 A1 Jun. 6, 2002

Related U.S. Application Data

(62) Division of application No. 09/628,223, filed on Jul. 28, 2000, now Pat. No. 6,364,478.
(60) Provisional application No. 60/159,152, filed on Oct. 13, 1999.

(51) Int. Cl.[7] .................................................. G02C 9/00
(52) U.S. Cl. ............................................ 351/47; 351/57
(58) Field of Search ............................ 351/47, 57, 48, 351/58, 41

(56) References Cited

U.S. PATENT DOCUMENTS

| 4,070,103 A | 1/1978 | Meeker |
| 5,416,537 A | 5/1995 | Sadler |
| 5,568,207 A | 10/1996 | Chao |
| 5,642,177 A | 6/1997 | Nishioka |
| 5,737,054 A | 4/1998 | Chao |
| 5,786,880 A | 7/1998 | Chao |
| 5,877,838 A | 3/1999 | Chao |
| 5,882,101 A | 3/1999 | Chao |
| 5,883,688 A | 3/1999 | Chao |
| 5,929,964 A | 7/1999 | Chao |
| 5,936,700 A | 8/1999 | Masunaga |
| 5,940,162 A | 8/1999 | Wong |
| 5,975,691 A | 11/1999 | Ku |
| 5,980,036 A | 11/1999 | Solomon |
| 6,012,811 A | 1/2000 | Chao et al. |
| 6,092,896 A | 7/2000 | Chao et al. |
| 6,102,144 A | 8/2000 | Lutz |
| 6,109,747 A | 8/2000 | Chao |
| 6,116,730 A | 9/2000 | Kwok |
| 6,116,732 A | 9/2000 | Xiao |
| 6,120,144 A | 9/2000 | Park |

(List continued on next page.)

FOREIGN PATENT DOCUMENTS

| CN | 762 09 045 | 9/1976 |
| DE | 85 07 761 U | 6/1985 |
| DE | 88 06 898 U | 10/1998 |
| EP | 1 061 253 | 4/1954 |
| JP | 02-109325 | 8/1991 |
| JP | 07-128620 | 5/1995 |
| WO | WO 90/09611 | 8/1990 |

Primary Examiner—Hung Xuan Dang
(74) Attorney, Agent, or Firm—Lawrence A. Greenberg; Werner H. Stemer; Ralph E. Locher

(57) ABSTRACT

An eyeglass device has a primary frame with temples and an auxiliary frame with first and second lens pairs, respectively. Rearwardly extending temples are attached to each end of a primary frame. An inside surface of the temples have a housing with walls defining a socket to receive a magnetic member. The auxiliary frame has rearwardly extending arms at each end, each having magnetic members. When the auxiliary frame and the primary frame are attached to form the eyeglass device, the auxiliary frame arms project over and are supported at least by the front portion of the primary frame to allow the magnetic members of the arms to engage the respective magnetic members of the temples side by side to stably support the frames together. The first lens pair can be eyeglass lenses, and the second lens pair can be sunglass lenses.

15 Claims, 2 Drawing Sheets

U.S. PATENT DOCUMENTS

| | | |
|---|---|---|
| 6,132,040 A | 10/2000 | Xiao |
| 6,139,141 A | 10/2000 | Zider |
| 6,139,142 A | 10/2000 | Zelman |
| 6,164,774 A | 12/2000 | Cate |
| 6,168,273 B1 | 1/2001 | Dupraz et al. |
| 6,170,948 B1 | 1/2001 | Chao |
| 6,170,949 B1 | 1/2001 | Mauch |
| 6,364,478 B1 * | 4/2002 | Jagasia ........................ 351/47 |

* cited by examiner

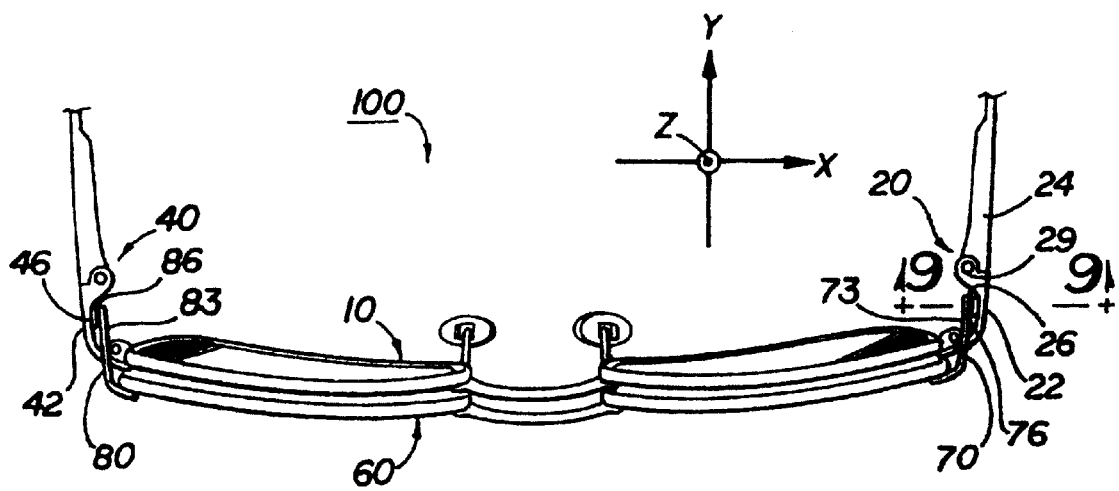
FIG 5
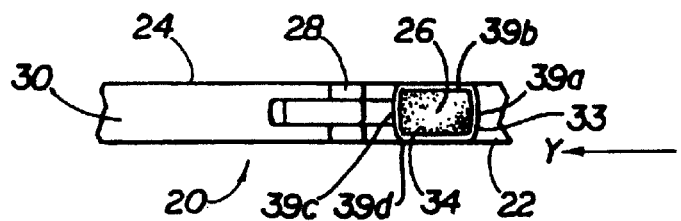
FIG 6
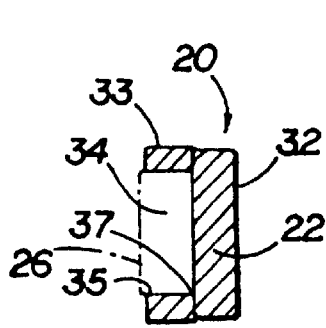 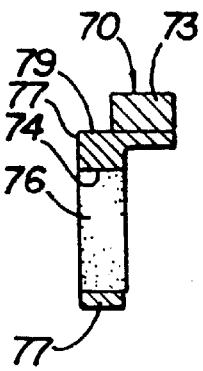 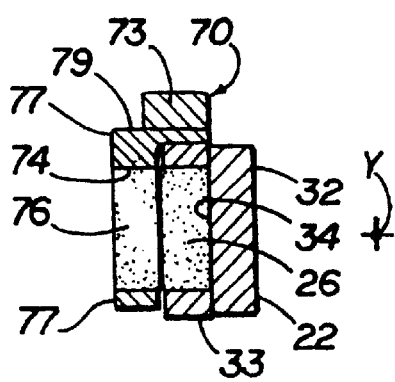
FIG 7   FIG 8   FIG 9

_EYEGLASS DEVICE HAVING MAGNETICALLY ATTACHED PRIMARY AND AUXILIARY FRAMES AND METHOD OF FORMING THE DEVICE_

CROSS-REFERENCE TO RELATED APPLICATION

This application is a divisional application of allowed U.S. patent application Ser. No. 09/628,223, filed on Jul. 28, 2000 now U.S. Pat. No. 6,364,478, which claims priority of U.S. Provisional Application No. 60/159,152, filed on Oct. 13, 1999.

BACKGROUND OF THE INVENTION

1. Field of the Invention

The invention relates to an eyeglass device having primary and auxiliary frames with lenses and method of forming the same, more particularly to an eyeglass device having primary and auxiliary frames with lenses, in which the auxiliary frame is supported by and engaged with the primary frame magnetically and mechanically.

2. Description of the Related Art

Use of magnetic material to engage an auxiliary frame with lenses with a primary frame with lenses is known in the art. There are several types of magnetic engagement mechanisms known in the prior art. One of them utilizes an auxiliary frame with an attachable slide-on rim cover or like device. In this type of the magnetic engagement mechanism, a primary frame includes a magnetic material of a first polarity secured to the exterior peripheral portion thereof for attachment to a corresponding magnetic material of a second or opposite polarity on the auxiliary lens rim cover.

Another type of magnetic engagement mechanism involves using first magnetic members secured to the front portion of a primary lens frame and second magnetic members secured at the corresponding aligned positions on the forward portion of the auxiliary frame.

Efforts have been made in the art to position first magnetic members on the various spots of the front portion, including the rim of the primary lens frame, the bridge of the primary lens frame, and top of both ends of the primary lens frame. Efforts have been also made in the art to position magnetic members on the leg portions of the primary frame for better engagement mechanism.

One common problem related to the eyeglass devices using currently available magnetic engagement mechanism is that they often do not satisfactorily prevent the auxiliary frame from moving in various directions relative to the primary frame. Consequently, unintended disengagement of the auxiliary frame from the primary frame may happen from time to time, especially when users of the eyeglasses conduct physical exercises involving activities such as jogging, running, or jumping. Using complicated mechanical structures to provide additional support can increase cost and comprise the integrity of the eyeglass devices.

Therefore, there is a need for a new engagement mechanism for properly engaging an auxiliary frame with lenses with a primary frame with lenses.

SUMMARY OF THE INVENTION

The disadvantages of the prior art are overcome by the present invention which provides an eyeglass device with magnetic members received in housings formed on the temples of the primary frame, thus substantially enhancing the support for the auxiliary frame.

In one aspect of the present invention, an eyeglass device has a first and second pair of lenses. The eyeglass device further has a primary frame and an auxiliary frame. The primary frame includes a front portion for holding the first pair of lenses, where the front portion has two opposed ends. A first temple is attached to one end of the front portion. The first temple has an inside surface, an opposite outside surface, and a housing formed on the inside surface, wherein the housing has a mouth and a bottom defining a socket therebetween to receive a magnetic member therein. A second temple is attached to the other end of the front portion. The second temple has an inside surface, an opposite outside surface, and a housing formed on the inside surface, wherein the housing has a mouth and a bottom defining a socket therebetween to receive a magnetic member therein. The first and second temples extend rearwardly from the front portion. The auxiliary frame includes a forward portion for holding the second pair of lenses, where the forward portion has two opposite ends. A first arm is attached to one end of the forward portion and has a magnetic member secured thereto. A second arm is attached to the other end of the forward portion and has a magnetic member secured thereto. The first and second arms extend rearwardly from the forward portion. When the auxiliary frame is detachably attached with the primary frame to form the eyeglass device, the first arm and the second arm of the auxiliary frame are projecting over and supported at least by the front portion of the primary frame to allow the magnetic member of the first arm to engage the magnetic member of the first temple, and the magnetic member of the second arm to engage the magnetic member of the second temple such that the auxiliary frame is disposed in front of the primary frame such that each lens of the second pair of lenses is in alignment with a respective lens of the first pair of lenses. The first and second pairs of lenses can have same or different optical characteristics such as focal point, color, refracting power, reflecting power, transparency, etc. In one embodiment, the first pair of the lenses are eyeglass lenses, and the second pair of the lenses are sunglass lenses or lenses with a material or coating thereon to filter ultraviolet light or other specific wavelengths of light.

In another aspect of the present invention, a primary frame is adapted to receive a first pair of lenses and support an auxiliary frame. The auxiliary frame has a forward portion for holding a second pair of lenses, where the forward portion has two opposite ends. A first arm is attached to one end of the forward portion and has a magnetic member secured thereto. A second arm is attached to the other end of the forward portion and having a magnetic member secured thereto, wherein the first and second arms extend rearwardly from the forward portion. The primary frame has a front portion for holding the first pair of lenses, where the front portion has two opposite ends. A first temple is attached to one end of the front portion. The first temple has an inside surface, an opposite outside surface, and a housing formed on the inside surface, wherein the housing has a mouth and a bottom defining a socket therebetween to receive a magnetic member therein. A second temple is attached to the other end of the front portion. The second temple has an inside surface, an opposite outside surface, and a housing formed on the inside surface, wherein the housing has a mouth and a bottom defining a socket therebetween to receive a magnetic member therein. The first and second temples extend rearwardly from the front portion. When the primary frame is supporting the auxiliary frame, at least one of the first arm and the second arm of the auxiliary frame projects over and is supported at least by the front portion of the primary frame to allow the magnetic member of the at least one arm to engage the magnetic member of a corresponding temple such that the auxiliary frame is disposed in front of the primary frame such that each lens of the second pair of lenses is in alignment with a respective lens of the first pair of lenses.

In yet another aspect of the present invention, an auxiliary frame is adapted to receive a first pair of lenses and be supported on a primary frame. The primary frame has a front portion for holding the second pair of lenses, where the front portion has two opposite ends. A first temple is attached to one end of the front portion. The first temple has an inside surface, an opposite outside surface, and a housing formed on the inside surface, wherein the housing has a mouth and a bottom defining a socket therebetween to receive a magnetic member therein. A second temple is attached to the other end of the front portion. The second temple has an inside surface, an opposite outside surface, and a housing formed on the inside surface, wherein the housing has a mouth and a bottom defining a socket therebetween to receive a magnetic member therein. The first and second temples extend rearwardly from the front portion. The auxiliary frame has a forward portion for holding the first pair of lenses, where the forward portion has two opposite ends. The first arm is attached to one end of the forward portion and has a magnetic member secured thereto. A second arm is attached to the other end of the forward portion and has a magnetic member secured thereto. At least one of the first and second arms includes a body extending rearwardly from the forward portion, an extension projecting downwardly from the body, and a flap projecting horizontally away from the body, wherein the extension has a socket located below the flap to secure the magnetic member of the at least one arm therein. When the auxiliary frame is supported by the primary frame, the at least one arm of the auxiliary frame projects over and is supported at least by the front portion of the primary frame to allow the flap of the at least one arm to be supported by the top portions of the housing of a corresponding temple and the magnetic member of the at least one arm to engage the magnetic member of the corresponding temple such that the auxiliary frame is disposed in front of the primary frame such that each lens of the first pair of lenses is substantially in alignment with a respective lens of the second pair of lenses.

In further aspect of the present invention, there is provided a method of forming an eyeglass device using a primary frame and an auxiliary frame. The primary frame has a front portion for holding a first pair of lenses, the front portion having two opposed ends. A first temple is attached to one end of the front portion and extends rearwardly from the front portion. The first temple has an inside surface, an opposite outside surface, and a housing formed on the inside surface, wherein the housing has a mouth and a bottom defining a socket therebetween to receive a magnetic member therein. A second temple is attached to the other end of the front portion and extends rearwardly from the front portion. The second temple has an inside surface, an opposite outside surface, and a housing formed on the inside surface, wherein the housing has a mouth and a bottom defining a socket therebetween to receive a magnetic member therein. The auxiliary frame has a forward portion for holding a second pair of lenses, the forward portion having two ends. A first arm is attached to one end of the forward portion and has a magnetic member secured thereto, and a second arm is attached to the other end of the forward portion of the auxiliary frame and has a magnetic member secured thereto, wherein at least one of the first and second arms includes a body extending from rearwardly from the forward portion, an extension projecting downwardly from the body, and a flap projecting horizontally away from the body, wherein the extension has a socket located below the flap to receive the magnetic member of the at least one arm therein. The method includes a step of detachably placing the auxiliary frame over the primary frame so that the at least one arm of the auxiliary frame projects over and is supported at least by the front portion of the primary frame to allow the flap of the at least one arm to be supported by the top portions of the housing of a corresponding temple and the magnetic member of the at least one arm to engage the magnetic member of the corresponding temple such that the auxiliary frame is disposed in front of the primary frame, thereby to allow the auxiliary frame to be stably supported by the primary frame.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

FIG. 5 is a top view of an eyeglass device formed according to the present invention by the primary and auxiliary spectacle frames as shown in FIGS. 1–4.

FIG. 6 shows a partial side view of the primary spectacle frame in FIG. 2 along the direction as shown by arrow (a).

FIG. 7 shows a cross-sectional view taken along lines 7—7 of FIG. 2.

FIG. 8 shows a cross-sectional view taken along lines 8—8 of FIG. 4.

FIG. 9 shows a cross-sectional view taken along lines 9—9 of FIG. 5.

DETAILED DESCRIPTION OF THE PREFERRED EMBODIMENTS

The invention may be understood more readily by reference to the following detailed description of preferred embodiments of the invention. Before the present articles and methods are disclosed and described, it is to be understood that the terminology used herein is for the purpose of describing particular embodiments only and is not intended to be limiting. It must be noted that, as used in the specification and the appended claims, the singular forms "a," "an " and "the" include plural references unless the context clearly dictates otherwise.

The present invention will now be described in detail with reference to the accompanying drawings including the texts therein, in which like numerals represent like components throughout the drawings.

Figure 1:
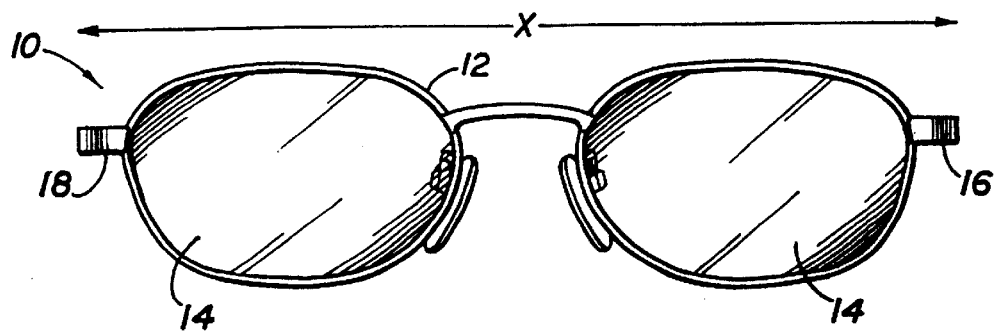
FIGS. 1 and 3 are front views of the primary and auxiliary spectacle frames in accordance with an embodiment of the present invention respectively.
Figure 2:
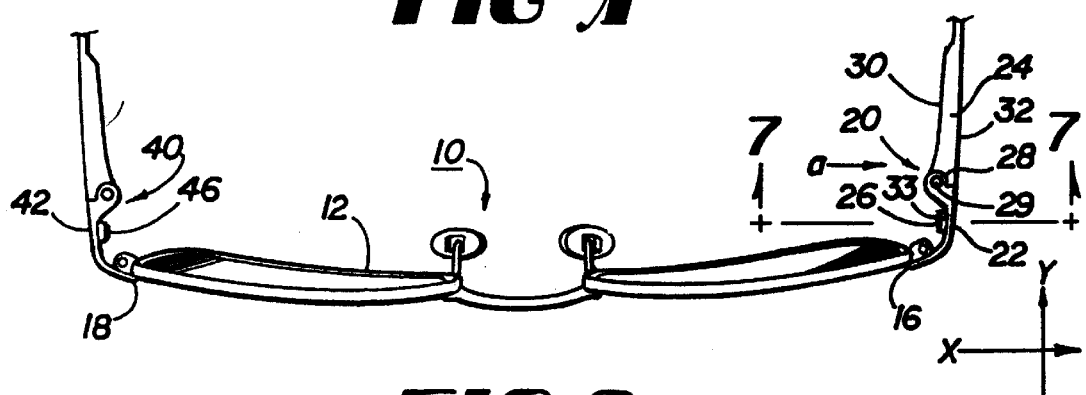
FIGS. 2 and 4 are top views of the primary spectacle frame and auxiliary spectacle frames as shown in FIGS. 1 and 3 respectively.

Referring initially to FIGS. 1 and 2, reference numeral 10 is a primary frame where a front portion 12 holds a pair of lenses 14. The primary frame 10 can be made of plastic, metal, a combination of both or other conventional material. The primary frame 10 can include metal support members embedded therein (not shown)'. The front portion 12 has two opposed ends 16, 18, defining an axis X extending from one end to another end. It will be appreciated throughout the description that the existence of the axis X should not be interpreted in any way implying that the front portion 12 always falls into one plane. Instead, in general, the front portion 12 has a more or less curved shape. Moreover, ends 16, 18 each can be an endpiece for connecting the front portion 12 with other parts of the spectacle frame 10, such as temples 20, 40 as discussed in more detail below. A first temple 20 is attached to end 16 of the front portion 12. The first temple 20 has an inside surface 30 and an opposite outside surface 32. In the embodiment shown in FIGS. 2 and 6, the first temple 20 has a lug portion 22 and a stem portion 24. The lug portion 22 is attached to the end 16 of the front portion 12. The stem portion 24 is pivotally coupled to the lug portion 22 through a hinge 28 and a screw 29. Alternatively, the first temple 20 can be a substantially one-piece structure (not shown) directly attached to the end 16 of the front portion 12.

Referring now to FIGS. 2, 6, 7 and 9, a housing 33 is formed on the inside surface of the lug portion 22. The housing 33 has a mouth 35 and a bottom 37 defining a socket 34 therebetween to receive and secure the magnetic member 26. The bottom 37 and the outside surface 32 are separated by a portion of the lug portion 22 so that the magnetic member 26 received in the socket 34 only communicates with ambient air at the mouth 35. The housing 33 includes sidewalls 39a–39d. Sidewalls 39a–39d can be arranged so that the socket 34 is substantially rectangular cross-sectionally, as shown in FIG. 6. Alternatively, sidewalls 39a–39d can be arranged so that the socket 34 has geometric shape other than rectangular cross-sectionally, such as oval, circular, diamond, square, etc. The housing 33 can be formed as an integral part of the lug portion 22, for example, by molding. The housing 33 can also be a port engraved in the lug portion. Alternatively, the housing 33 can be manufactured separately and then attached to the lug portion 22. If made separately, a housing 33 can be attached to the lug portion 22 by glue, heat sealing or other conventional methods. Furthermore, although the housing 33 is positioned at the inside surface of the lug portion 22 as shown in FIGS. 2 and 5–7, the housing 33 can be positioned in other locations of the inside surface 30 of the first temple 20.

A second temple 40 is attached to the other end 18 of the front portion 12. In the embodiment shown in FIG. 2, the second temple 40 has a structure similar to, but in the form of mirror-image of the first temple 20. Moreover, when in use, the first temple 20 and the second temple 40 are substantially parallel to each other, thereby defining an axis Y substantially perpendicular to the axis X of the front portion. Consequently, the magnetic member 26 associated with the first temple 20 and magnetic member 46 associated with the second temple 40 are located to opposite each other and substantially aligned along the Y-axis. For their embodiment shown in FIG. 2, the first temple 20 can be referred as a left temple, and the second temple 40 can be referred as a right temple.

Figure 3:
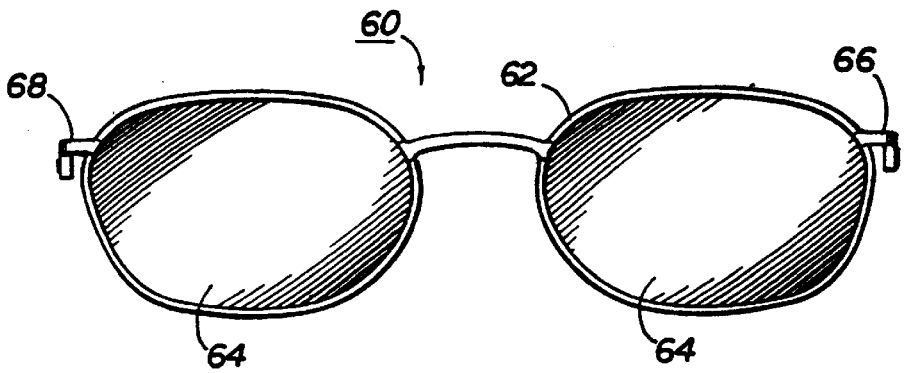
Figure 4:
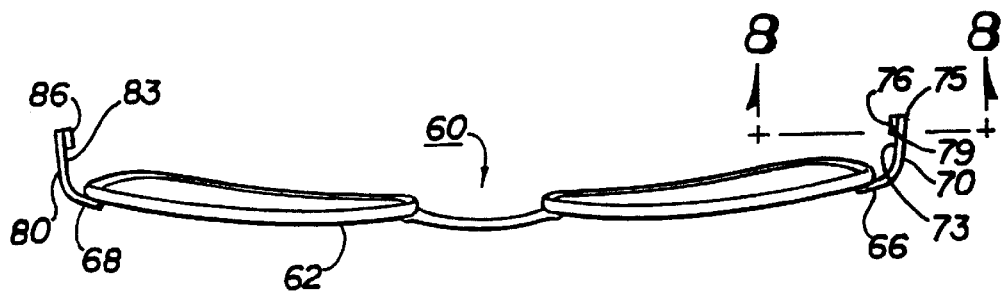

Referring now to FIGS. 3, 4 and 8, reference numeral 60 is an auxiliary frame where a forward portion 62 holds a pair of lenses 64. The auxiliary frame 60 can be made of plastic, metal, a combination of both or other conventional material. The auxiliary frame 60 can include metal support members embedded therein (not shown). One use for the auxiliary frame 60 is to provide protection to the wearer from sunlight and/or other vision damaging elements. Therefore, the auxiliary frame 60 may have tinted lenses with a tint that is darker than the tint of lenses of the primary frame 10, and may also include material therein or a coating thereon to filter ultraviolet light or other specific wavelengths of light. The auxiliary frame 60 may also be used to provide a complimentary pair of lenses, which, in combination with the lenses of the primary frame 10, provides an eyeglass device fitting to the needs of the wearer. Thus, the pair of lenses of the auxiliary frame 60 and the pair of lenses of the primary frame 10 can have same or different optical characteristics such as focal point, color, refracting power, reflecting power, transparency, etc. The pair of lenses of the auxiliary frame 60 and the pair of lenses of the primary frame 10 can be made from same or different materials. Furthermore, the lenses of each of the pair of lenses of the auxiliary frame 60 and the pair of lenses of the primary frame 10 can have different or same optical characteristics.

The forward portion 62 has two ends 66, 68. A first arm 70 is attached to end 66 of the forward portion 62 of the auxiliary frame 60. The first arm 70 has a body 73 that extends rearwardly from the forward portion 62 and terminates at a first end 75. The first arm 70 has an extension 77 projecting downwardly from the body 73 in the vicinity of the first end 75. A flap 79 projects horizontally away from the body 73. The flap 79 can be a part of the extension 77. The extension 77 has a socket 74 located below the flap 79 for receiving and securing a magnetic member 76 therein. Alternatively, the magnetic member 76 can be directly attached to the first arm 70. In the embodiment shown in FIG. 4, the extension 77 can be an integral part of the first arm. Alternatively, the extension 77 can be manufactured separately and then attached to the body 73 by glue, heat sealing or other conventional methods.

Additionally, a second arm 80 is attached to the other end 68 of the forward portion 62 of the auxiliary frame 60. In the embodiment shown in FIG. 4, the second arm 80 has a structure similar to, but in the form of substantially mirror-image of, the first arm 70. The second arm 80 has a body 83 that extends rearwardly from the forward portion 62 and has a magnetic member 86 attached thereto. In the embodiment shown in FIGS. 3 and 4, the first arm 70 and the second arm 80 of the auxiliary frame 60 are aligned opposite each other. The first arm 70 can be referred as a left arm, and the second arm 80 can be referred as a right arm.

The auxiliary frame 60 shown in FIGS. 4 and 5 is a one-piece device. That is, the pair of lenses 64 cover both of the pair of lenses 14 of the primary frame 10. Alternatively, the auxiliary frame 60 may be two separate pieces, one to cover each of the pair of lenses 14 of the primary frame 10. Furthermore, the auxiliary frame 60 may just have one lens to cover one of the pair of lenses 14 of the primary frame 10.

The auxiliary frame 60 can be detachably attached to the front of the primary frame 10 to form an eyeglass device 100. As shown in FIG. 5, when the auxiliary frame 60 is put on the front of the primary frame 10, the first arm 70 and the second arm 80 of the auxiliary frame 60 are projecting over and supported substantially by the front portion 12. Moreover, the flap of each of the first arm 70 and the second arm 80 projects over the respective housing and engages the top surface of the respective housing and a portion of the respective lug portion. For example, as shown in FIG. 9, the flap 79 of the first arm 70 projects over the housing 33. The flap 39 engages the top surface of the housing 33 and a portion of the lug portion 22. That not only provides the first and second arms 70, 80 with additional mechanical supports from the respective lug portions through the engagement of the corresponding flap and the housing but also allows magnetic members 26, 46 to be aligned with magnetic members 76, 86 so that the magnetic member 76 of the first arm 70 engages the magnetic member 26 of the first temple 20 side by side, and the magnetic member 86 of the second arm 80 engages the magnetic member 46 of the second temple 40 side by side. Thus, the auxiliary frame 60 is stably supported by the primary frame 10 both mechanically and magnetically. Moreover, as shown in FIG. 9, the magnetic member 26 is separated from the ambient air by the magnetic member 76 and the lug portion 22, when the auxiliary frame 60 is in proper engagement with the primary frame 10, to offer an eyeglass device 100 with attractive appearance.

In this embodiment, as shown in FIGS. 5 and 9, the primary frame 10 and the auxiliary frame 60 are previously designed to have the proper size relative to each other so that there is a complimentary fit between them to form a uniform appearance.

The engagement mechanism of the present invention is advantageous over the prior art in several aspects. One feature is that unlike the point contact, localized support the auxiliary frame receives from the primary frame in the prior art, the present invention offers a multi-dimensional engagement. Specifically, the movement of the auxiliary frame 60 relative to the primary frame 10 along the X-axis of the front portion 12 of the primary frame 10 is prohibited by the magnetic members 26, 46 of the first and second temples 20, 40. Because the span of the auxiliary frame 60 is sized to fit into a space therebetween the first and second temples 20, 40, the tension forces provided by the first and second arms 70, 80 of the auxiliary frame 60 when they make contact with the first and second temples 20, 40, respectively, further reinforce the engagement of the auxiliary frame 60 with the primary frame 10 along the X-axis. Moreover, the movement of the auxiliary frame 60 relative to the primary frame 10 along the Y-axis is prohibited at least by the front portion 12 of the primary frame 10. The mapetical engagement between corresponding pairs of magnetic members 26, 46 with magnetic members 76, 86, respectively, provides additional stable force along the Y-axis. Furthermore, the movement of the auxiliary frame 60 relative to the primary frame 10 along a direction perpendicular to both the X-axis and the Y-axis, i.e., along the Z-axis, especially downward movement of the auxiliary frame 60, is prohibited by the front portion 12 of the primary frame 10 and the first and second temples 20, 40 because the arms of the auxiliary frame 60 are supported by the front portion 12 and the Raps of the arms are supported by the housings. Because the engagement of the primary frame 10 and the auxiliary frame 60 according to the present invention is not localized at the front portions of the first and auxiliary frames 10, 60, but distributed over a plane defined by the X is and Y axes, the eyeglass device 100 of the present invention has superior stability. Moreover, the auxiliary frame 60 can be easily detached from the primary frame 10 when needed.

In the embodiment shown in FIGS. 6–9, a rectangular magnetic member 26 is received in the socket 34 of the housing 33 associated with the first temple 20, where the socket 34 is rectangular cross-sectionally. A similar arrangement is made with respective to the magnetic member 46 and the second temple 40. The magnetic member 26 can take geometric shapes other than rectangle. The magnetic members used in the present invention are made from magnetic materials known in the art. The magnetic members received in the lug portions 22, 42 and the magnetic members 76, 86 associated with the first and second arms 70, 80 can be same or different, material-wise, shape-wise or size-wise. Each of the magnetic members in connection with the present invention can be a magnet, or made of a magnetic material such as a permanent magnetic material, or a ferromagnetic material.

Additionally, the location of the magnetic members can be changed so that, for instance, magnetic members 26, 46 are located on the exterior surfaces of the lug portions 22, 42 with magnetic members 76, 86 then being appropriately positioned on the interior surfaces of arms 70, 80. The magnetic members 76, 86 can also be received 5 in sockets formed on arms 70, 80.

Other embodiments of the invention will be apparent to those skilled in the art from consideration of the specification and practice of the invention disclosed herein. It is intended that the specification and examples be considered as exemplary only.

I claim:

1. An eyeglass device having a first and second pairs of lenses, comprising:
   a. a primary frame comprising:
      (i) a front portion for holding the first pair of lenses and having two opposed ends;
      (ii) a first temple attached to one end of the front portion and having an inside surface, an opposite outside surface, and a housing formed on the inside surface of the first temple, wherein the housing has a mouth and a bottom defining a socket therebetween to receive a magnetic member therein; and
      (iii) a second temple attached to the other end of the front portion and having an inside surface, an opposite outside surface, and a housing formed on the inside surface of the second temple, wherein the housing has a mouth and a bottom defining a socket therebetween to receive a magnetic member therein,
   wherein the first and second temples extend rearwardly from the front portion, and
   b. an auxiliary frame comprising:
      (i) a forward portion for holding the second pair of lenses and having two opposite ends;
      (ii) a first arm attached to one end of the forward portion and having a magnetic member secured thereto; and
      (iii) a second arm attached to the other end of the forward portion and having a magnetic member secured thereto,
   wherein the first and second arms extend rearwardly from the forward portion, and
   wherein the first arm and the second arm of the auxiliary frame are projecting over and supported at least by the front portion of the primary frame to allow the magnetic member of the first arm to engage the magnetic member of the first temple, and the magnetic member of the second arm to engage the magnetic member of the second temple such that the auxiliary frame is disposed in front of the primary frame such that each lens of the second pair of lenses is in alignment with a respective lens of the first pair of lenses.

2. The eyeglass device according to claim 1, wherein the first pair of lenses and the second pair of lenses have same or different optical characteristics.

3. The eyeglass device according to claim 2, wherein each pair of the first pair and the second pair of lenses are eyeglass lenses or sunglass lenses.

4. The eyeglass device according to claim 1, wherein the first temple comprises:

a. a stem portion; and b. a lug portion.

wherein the lug portion is attached to the one end of the front portion, and the stem portion is pivotally coupled to the lug portion.

5. The eyeglass device according to claim 4, wherein the housing of the first temple is positioned on the lug portion.

6. The eyeglass device according to claim 1, wherein the second temple comprises:

a. a stem portion; and b. a lug portion wherein the lug portion is attached to the other end of the front portion, and the stem portion is pivotally coupled to the lug portion.

7. The eyeglass device according to claim 6, wherein the housing of the second temple is positioned on the lug portion.

8. The eyeglass device according to claim 1, wherein the magnetic members of the primary frame are magnets.

9. The eyeglass device according to claim 1, wherein the magnetic members of the auxiliary frame are magnets.

10. A primary frame adapted to receive a first pair of lenses and support an auxiliary frame, which has:

(i) a forward portion for holding a second pair of lenses and having two opposite ends;

(ii) a first arm attached to one end of the forward portion and having a magnetic member secured thereto; and (iii) a second arm attached to the other end of the forward portion and having a magnetic member secured thereto, wherein the first and second arms extend rearwardly from the forward portion, the primary frame comprising:

(i) a front portion for holding the first pair of lenses and having two opposed ends;

(ii) a first temple attached to one end of the front portion and having an inside surface, an opposite outside surface, and a housing formed on the inside surface of the first temple, wherein the housing has a mouth and a bottom defining a socket therebetween to receive a magnetic member therein; and (iii) a second temple attached to the other end of the front portion and having an inside surface, an opposite outside surface, and a housing formed on the inside surface of the second temple, wherein the housing has a mouth and a bottom defining a socket therebetween to receive a magnetic member therein, wherein the first and second temples extend rearwardly from the front portion; and when the primary frame is supporting the auxiliary frame, at least one of the first arm and the second arm of the auxiliary frame projects over and is supported at least by the front portion of the primary frame to allow the magnetic member of the at least one arm to engage the magnetic member of a corresponding temple such that the auxiliary frame is disposed in front of the primary frame such that each lens of the second pair of lenses is in alignment with a respective lens of the first pair of lenses.

11. The primary frame according to claim 10, wherein the lenses of the first pair of lenses have different or same optical characteristics.

12. The primary frame according to claim 10, wherein the first pair of lenses are eyeglass lenses or sunglass lenses.

13. The primary frame according to claim 10, wherein each of the first and second temples comprises:

a. a stem portion; and b. a lug portion, wherein the lug portion is attached to one of the ends of the front portion, and the stem portion is pivotally coupled to the lug portion.

14. The primary frame according to claim 10, wherein each of the housings of the first and second temples is positioned on the lug associated with that temple.

15. The primary frame according to claim 10, wherein the magnetic members of the primary frame are magnets.

* * * * *